United States Patent [19]

Inoue et al.

[11] Patent Number: 5,220,461
[45] Date of Patent: Jun. 15, 1993

[54] LENS BARREL APPARATUS FOR AUTOMATIC FOCUSING

[75] Inventors: Norikatsu Inoue; Satoshi Sakamoto, both of Tokyo, Japan

[73] Assignee: Sony Corporation, Japan

[21] Appl. No.: 754,594

[22] Filed: Sep. 4, 1991

[30] Foreign Application Priority Data

Sep. 10, 1990 [JP] Japan .............................. 2-2239447

[51] Int. Cl.$^5$ ............................................. G02B 7/02
[52] U.S. Cl. .................................... 359/824; 359/823
[58] Field of Search ........................ 359/824, 822–823, 359/826; 250/201.2, 201.4

[56] References Cited

U.S. PATENT DOCUMENTS 5,138,497  8/1992  Blanding ............................. 359/823
5,140,471  8/1992  Kasahara ............................ 359/823

OTHER PUBLICATIONS

Patent Abstracts of Japan, vol. 8, No. 82, Apr. 14, 1984.
Patent Abstracts of Japan, vol. 12, No. 216, Jun. 21, 1988.
Patent Abstracts of Japan, vol. 12, No. 233, Jul. 5, 1988.
Patent Abstracts of Japan, vol. 10, No. 165 Jun. 12, 1986.
Patent Abstracts of Japan, vol. 14, No. 279, Jun. 15, 1990.

*Primary Examiner*—Bruce Y. Arnold
*Assistant Examiner*—James Phan
*Attorney, Agent, or Firm*—Ronald P. Kananen

[57] ABSTRACT

A novel lens barrel which includes a comparatively small number of parts, has a comparatively low weight and can be produced at a comparatively low cost. The lens barrel apparatus comprises an outer shell, a lens holding member holding a focusing lens thereon and mounted in the outer shell for movement in a direction of an optic axis of the focusing lens, and an actuator including an actuating coil secured to one of the lens holding member and the outer shell and wound around a coil bobbin. The actuator further includes a magnet secured to the other of the lens holding member and the outer shell in a coaxial relationship with the actuating coil around the optic axis, and a detecting coil is wound on the coil bobbin in an overlapping relationship with the actuating coil for detecting a speed of movement of the focusing lens.

2 Claims, 8 Drawing Sheets

LENS BARREL APPARATUS FOR AUTOMATIC FOCUSING

BACKGROUND OF THE INVENTION

1. Field of the Invention

This invention relates to a novel lens barrel apparatus for automatic focusing, and more particularly to a lens barrel apparatus for automatic focusing which includes electromagnetic actuating means for moving a focusing lens and speed detecting means for detecting a speed of movement of the focusing lens.

2. Description of the Prior Art

A lens barrel apparatus for a camera having an automatic focusing function normally includes actuating means for moving a focusing lens in a direction of an optic axis thereof and speed detecting means for detecting a speed of movement of the focusing lens. An actuator of the electromagnetically driving type including a coil and a magnet is employed comparatively frequently as the driving means while an electromagnetic sensor element including a coil and a magnet is employed comparatively frequently as the speed detecting means.

FIGS. 7 and 8 show an exemplary one of conventional lens barrel apparatus which includes such actuator and sensor element as described just above. Referring to FIGS. 7 and 8, the lens barrel apparatus generally denoted at a includes an outer shell b having a substantially prism-like profile elongated in a forward and rearward direction, and several lenses including a master lens c are disposed in the inside of the outer shell b such that they have a common optic axis. The master lens c is held in a light passing hole formed at the center of a lens holding member d having a ring-like profile.

A mounting arm e extends radially outwardly from a right upper portion of the lens holding member d and has a tubular bearing portion f formed integrally at an end portion thereof in parallel to the optic axis. Meanwhile, a guide arm g extends radially outwardly from another portion of the lens holding member d remote from the mounting arm e with respect to the light passing hole and has a fork-shaped receiving portion h formed at an end thereof.

A cylindrical coil bobbin i is formed such that it extends forwardly from an inner circumferential edge of the light passing hole of the lens holding member d, and an actuating coil j is wound in a direction around the optic axis on the coil bobbin i.

A magnet holding member k extends radially outwardly from a right lower portion of the lens holding member d and includes a tubular portion formed at an end thereof such that it extends rearwardly by a small distance in parallel to the optic axis, and a detecting magnet l having a generally bar-like profile is held in a force-fitted condition in and extends rearwardly through and from the tubular portion of the magnet holding member k. The detecting magnet l is magnetized such that it has the opposite polarities at the opposite ends in a longitudinal direction thereof.

A sliding shaft m is disposed at a right upper portion of the lens holding member d in parallel to the optic axis in the outer shell b, and the bearing portion f of the mounting arm e of the lens holding member d is fitted for sliding movement on the sliding shaft m.

A guide shaft n is disposed at a right lower portion of the lens holding member d in parallel to the optic axis in the outer shell b, and the receiving portion h of the guide arm g of the lens holding member d is supported in a gripping condition on the guide shaft n.

The lens holding member d is supported on the sliding shaft m for movement in the direction of the optic axis under the guidance of the guide shaft n in the outer shell b. Accordingly, the master lens c is supported for movement on the lens holding member d in the forward and backward direction of the lens barrel apparatus a.

A support member o is secured in an inwardly fitted condition to a forward end of the outer shell b forwardly of the lens holding member d. A light passing hole is formed in the support member o forwardly in an opposing relationship to the master lens c, and a lens p is disposed in the light passing hole of the support member o.

A yoke q is disposed on a face of the support member o opposite to the master lens c such that it surrounds the light passing hole of the support member o. The yoke q is formed as a unitary member of a metal material having a good permeability and includes a ring-shaped intermediate yoke portion, an inner yoke portion extending rearwardly from an inner circumferential edge of the intermediate yoke portion and an outer cylindrical yoke portion extending rearwardly from an outer circumferential edge of the intermediate yoke portion in a coaxial parallel relationship to the inner yoke portion.

A cylindrical magnet r is secured in an inwardly fitted condition to the outer yoke portion of the yoke q such that it is magnetized such that it has the opposite polarities in a radial direction perpendicular to an axis thereof and a closed magnetic path along which magnetic fluxes coming out from the magnet r pass is formed by the magnet r and the yoke q.

The actuating coil j is wound around the coil bobbin i and is positioned between the inner yoke portion of the yoke q and the magnet r with small gaps left from them such that it is positioned on the closed magnetic path described above.

Thus, if driving current is supplied to the actuating coil j, then magnetic fluxes are produced from the actuating coil j in a direction corresponding to a direction of such driving current, and consequently, a forwardly or rearwardly urging force is exerted in the actuating coil j to move the lens holding member d together with the master lens c.

The outer shell b has a rear wall s having a light passing hole formed substantially at the center thereof rearwardly of the master lens. A tubular portion t is formed at a right rear portion of a front face of the rear wall s of the outer shell b, and a detecting coil u wound in a tubular profile is mounted in an inwardly fitted condition on an inner periphery of the tubular portion t. A rear end portion of the detecting magnet l of the lens holding member d extends into an inner spacing of the detecting coil u.

When the lens holding member d moves, the detecting magnet l is moved together therewith. Consequently, an electric current corresponding to a speed of such movement is induced in and flows through the detecting coil t. A speed of movement of the lens holding member d is thus detected by detecting a magnitude of such electric current.

With such conventional lens barrel apparatus a, the detecting magnet l for the exclusive use is required to detect a speed of movement of the master lens c. Accordingly, the lens barrel apparatus a is disadvantageous in that the number of parts cannot be reduced in such regard and a special accommodating spacing is

SUMMARY OF THE INVENTION

It is an object of the present invention to provide a novel lens barrel which includes a comparatively small number of parts, has a comparatively low weight, and can be produced at a comparatively low cost.

In order to attain the object, according to the present invention, there is provided a lens barrel apparatus for automatic focusing which comprises an outer shell, a lens holding member holding a focusing lens thereon and mounted in the outer shell for movement in a direction of an optic axis of the focusing lens, an actuator including an actuating coil secured to one of the lens holding member and the outer shell and wound around a coil bobbin, the actuator further including a magnet secured to the other of the lens holding member and the outer shell in a coaxial relationship with the actuating coil around the optic axis, and a detecting coil wound on the coil bobbin in an overlapping relationship with the actuating coil for detecting a speed of movement of the focusing lens.

With the lens barrel apparatus for automatic focusing, such a detecting magnet for exclusive use for detecting a speed of movement of the focusing lens as in the conventional lens barrel apparatus described above is unnecessary, and consequently, the spacing required for accommodating such detecting magnet is unnecessary. Accordingly, the lens barrel apparatus can be reduced in size and also in number of parts as much, and accordingly, reduction in weight and reduction in cost can be achieved.

The above and other objects, features and advantages of the present invention will become apparent from the following description and the appended claims, taken in conjunction with the accompanying drawings.

DETAILED DESCRIPTION OF THE PREFERRED EMBODIMENT

Figure 3:
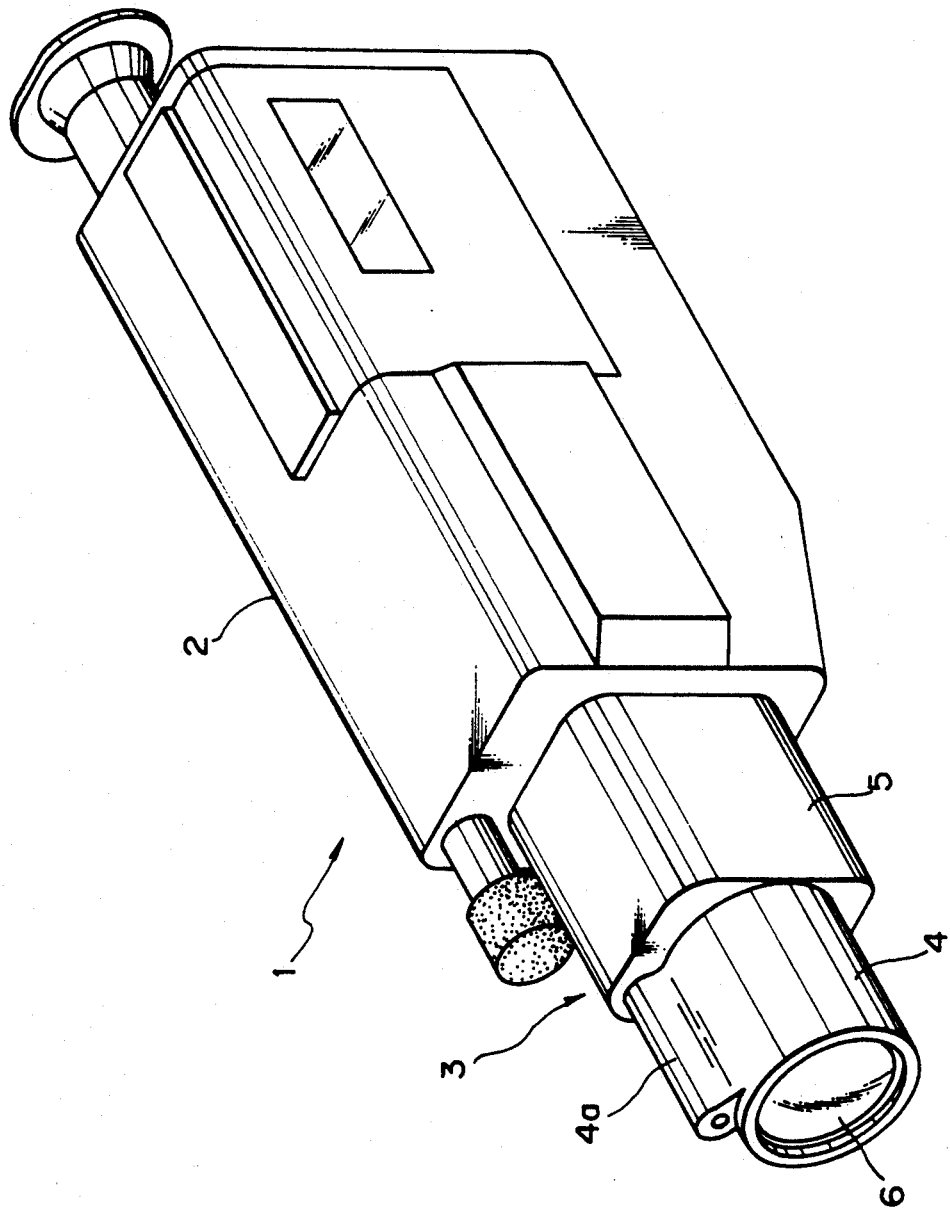
FIG. 3 is a perspective view of a video camera in which the lens barrel apparatus of FIG. 1 is incorporated.

Referring first to FIG. 3, there is shown a video camera in which a lens barrel apparatus according to the present invention is incorporated. The video camera is generally denoted at 1 and includes a body 2, and a lens barrel apparatus 3 according to the present invention is incorporated in the video camera 1. The lens barrel 3 includes a front side outer shell 4 having a substantially cylindrical profile and a rear side outer shell 5 having a substantially prism-like profile. The two outer shells 4 and 5 extend forwardly from a front end face of the body 2 of the video camera 1 and are coupled to each other in forward and rearward positions relative to each other.

Referring to FIGS. 1 to 3, 5 and 6, a plurality of lenses 6, 7, 8, 9 and 10 each having a predetermined light controlling function are arranged in this order from the front in the outer shells 4 and 5 such that they have a single common optic axis X—X. The lenses 6 and 7 are positioned in the front side outer shell 4 and constitute a zooming lens system while the other lenses 8, 9 and 10 are positioned in the rear side outer shell 5 and constitute a focusing lens system. The lens 7 serves as a movable lens for zooming while the rear end side lens 10 is a so-called master lens and serves as a movable lens for focusing.

It is to be noted that, though not shown in the drawings, a cassette loading mechanism on which a tape cassette is to be removably loaded, a tape feeding mechanism, recording means for converting an optical image taken by the lens system into an electric signal and magnetically recording such electric signal onto a magnetic tape of the tape cassette, and so forth are provided in the inside of the portion 2 of the video camera 2.

Figure 4:
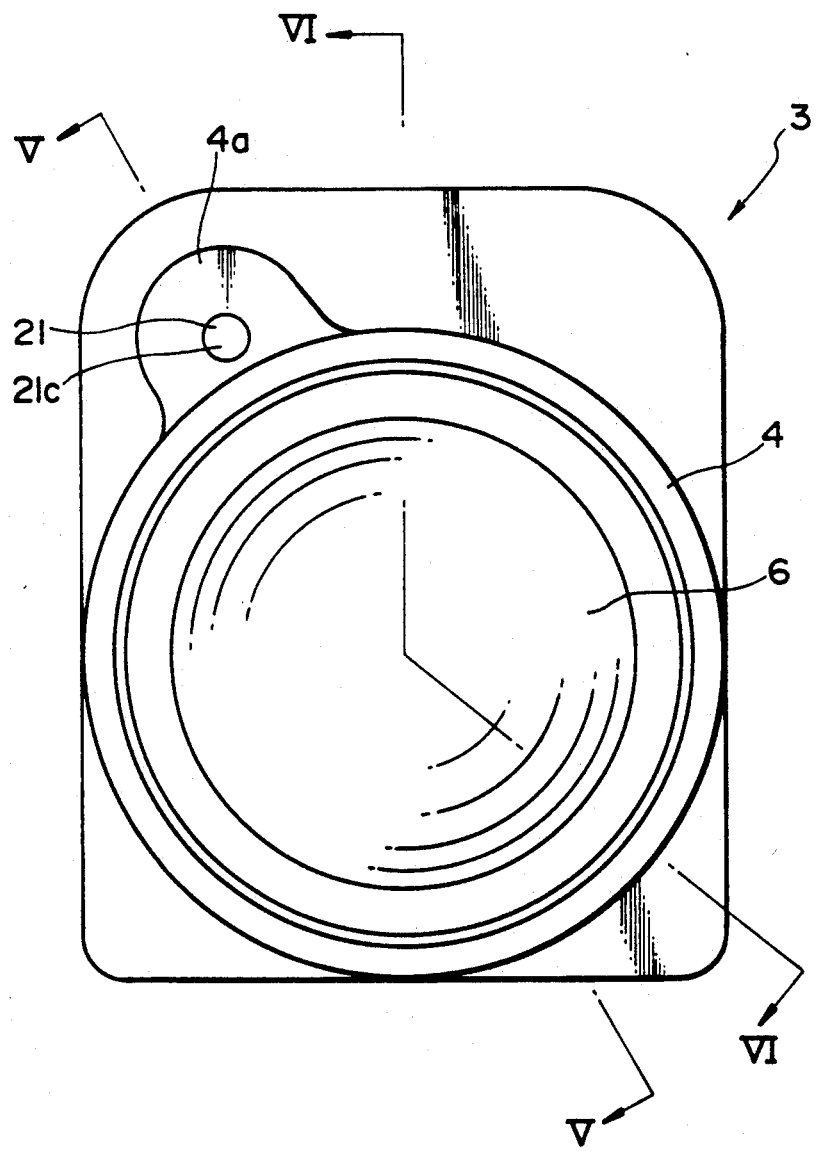
FIG. 4 is a front elevational view of the lens barrel apparatus of FIG. 1.
Figure 5:
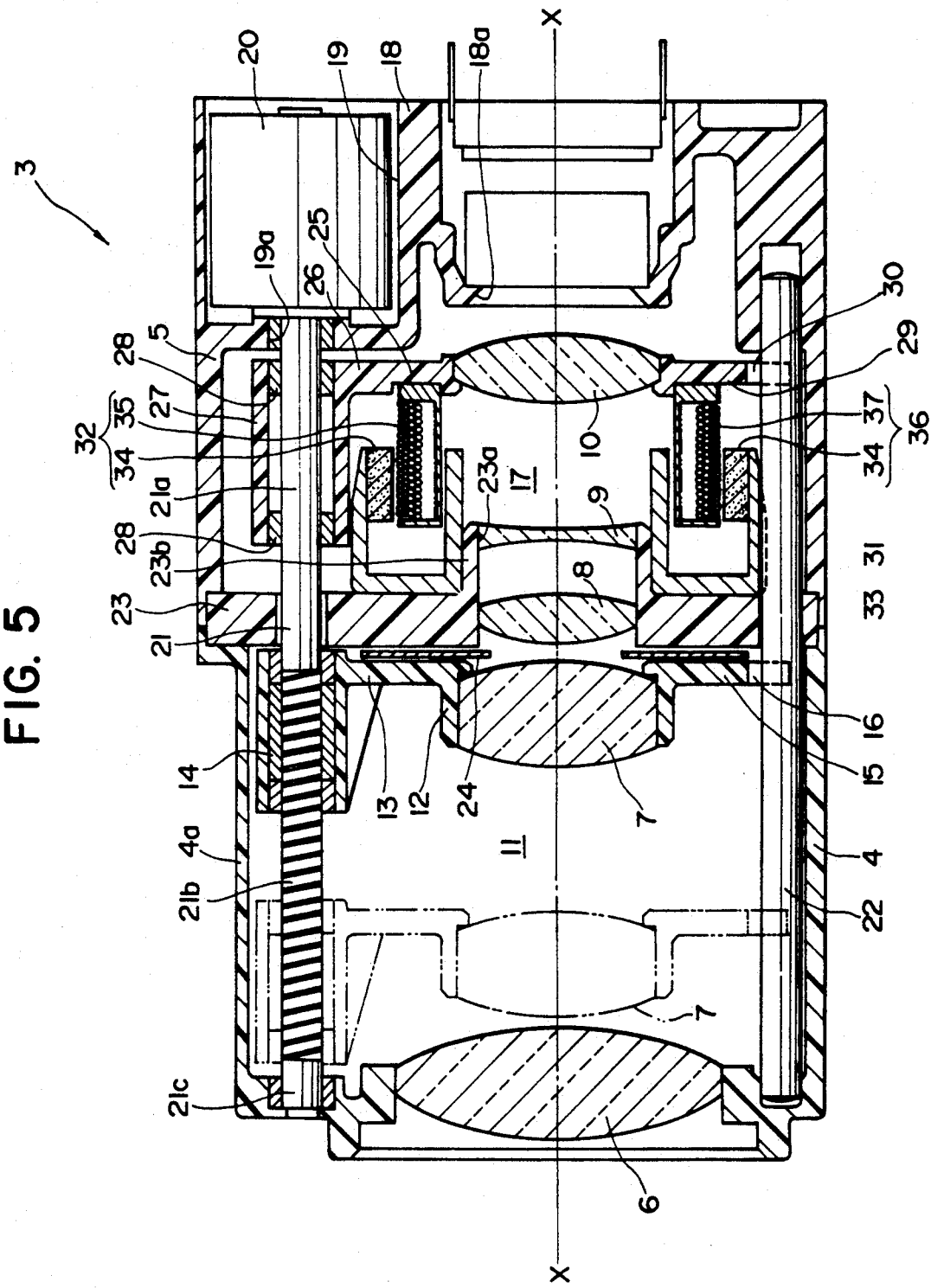
FIG. 5 is a sectional view taken along line V—V of FIG. 4.
Figure 6:
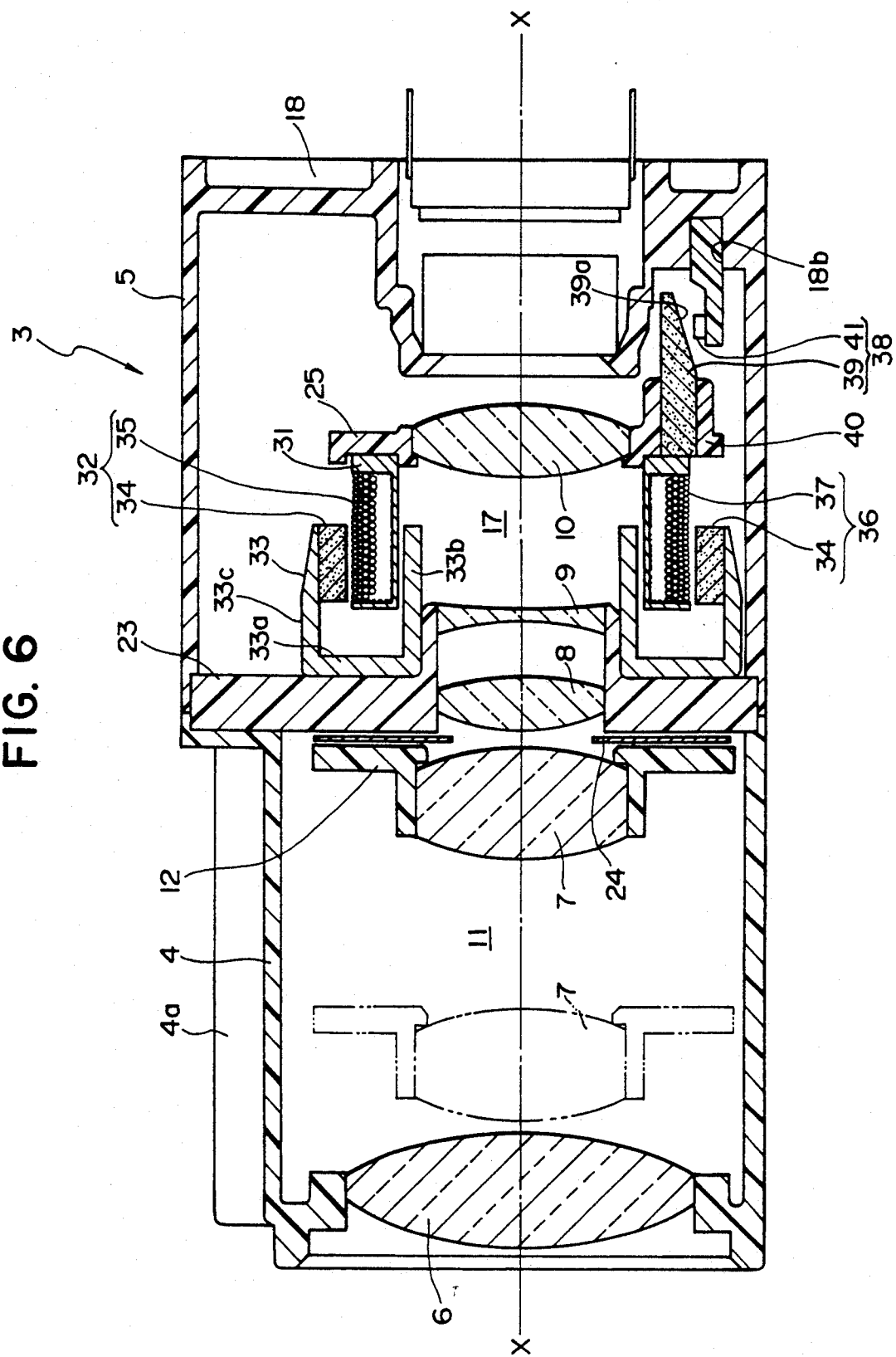
FIG. 6 is a sectional view taken along line VI—VI of FIG. 4.
Figure 7:
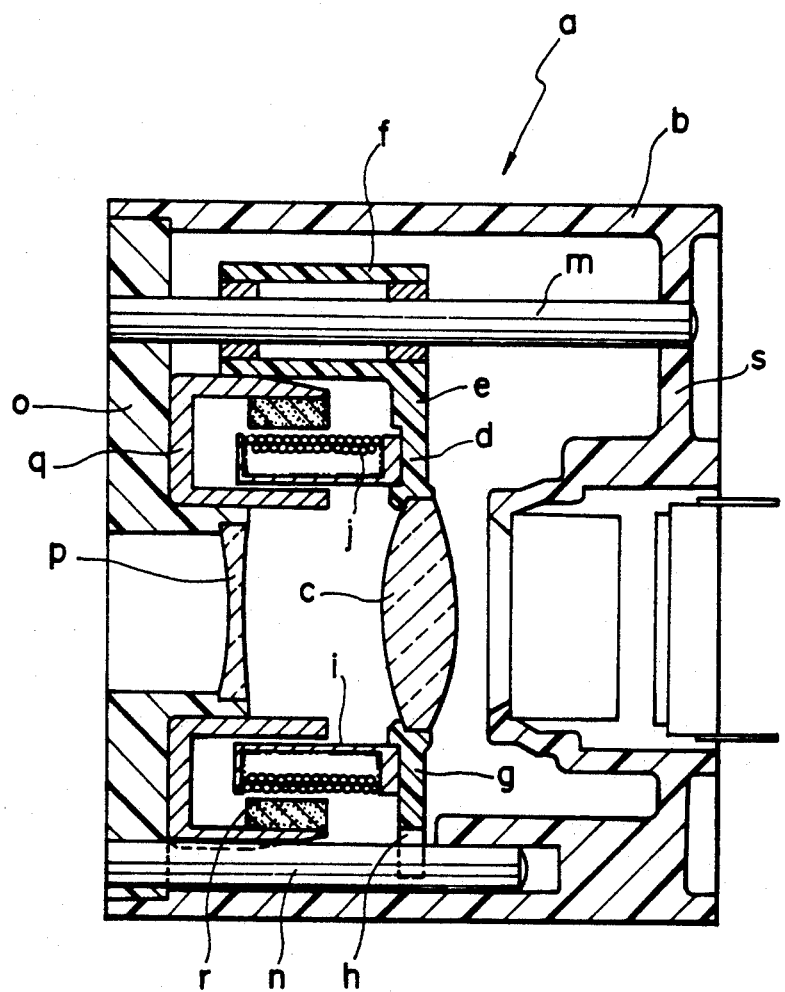
FIGS. 7 and 8 are sectional views of a conventional lens barrel apparatus for a camera taken along perpendicular planes including an optic axis of the camera.
Figure 8:
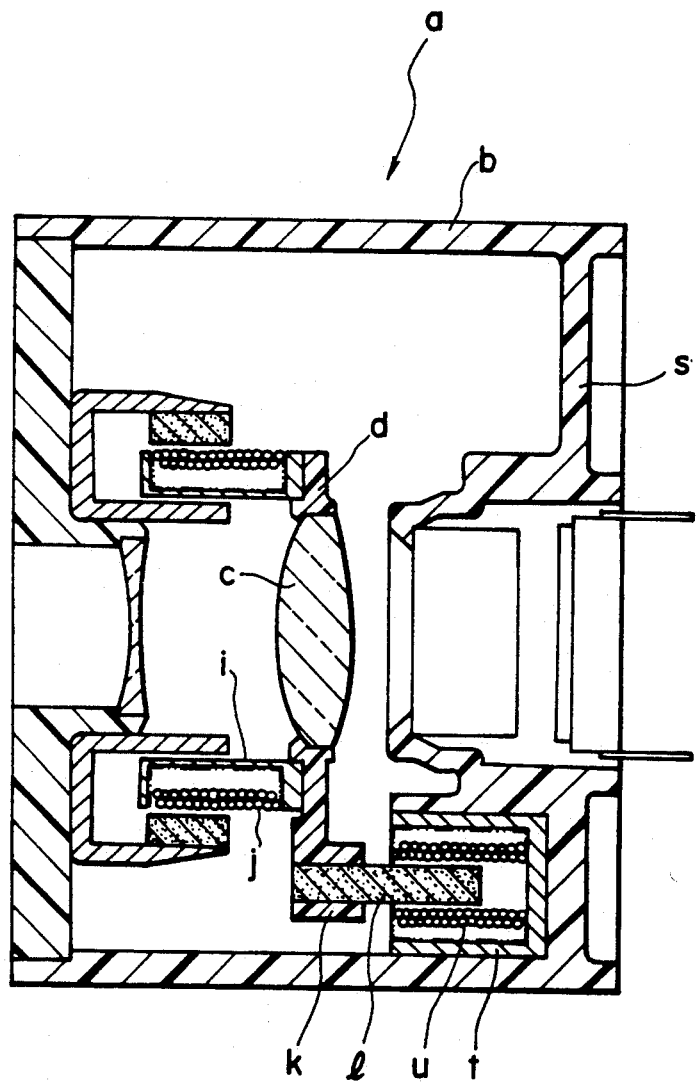

Referring now to FIGS. 4 to 6, a spacing 11 is formed in the front side outer shell 4 and is open to the opposite front and rear faces of the front side outer shell 4. The spacing 11 has a substantially circular cross section in a direction perpendicular to the optic axis X—X, and a radially projected hollow rib 4a having a semicircular cross section is formed at a right upper portion of front side outer shell 4 and extends along the entire length of the spacing 11. An output shaft 21 of a zooming motor 20 which will be hereinafter described in detail is disposed in the inside of the rib 4a.

The lens 6 is disposed at the front side opening of the front side outer shell 4.

The zooming lens 7 is held in a zooming lens holding member 12 having a ring-like profile. The zooming lens holding member 12 has a tubular portion provided integrally on and extending forwardly from an inner circumferential edge thereof, and the zooming lens 7 is held in an inwardly fitted condition in the tubular portion of the zooming lens holding member 12.

The zooming lens holding member 12 further has a mounting arm 13 formed integrally thereon such that it extends outwardly from a right upper portion thereof, and a nut 14 is secured to an end of the mounting arm 13 such that the end portion of the mounting arm 13 including the nut 14 is positioned in the inside of the radially projected rib 4a of the front side outer shell 4.

A guide arm 15 is formed integrally on and extends outwardly from a left lower portion of the zooming lens holding member 12, and a fork-shaped receiving portion 16 is formed at an end portion of the guide arm 15.

The nut 14 secured to the mounting arm 13 of the zooming lens holding member 12 is screwed to a threaded portion of a front half portion of the output shaft 21 of the zooming motor 20 while the receiving portion 16 of the guide arm 15 is supported for sliding movement on a guide shaft 22 thereby to support the zooming lens holding member 12 for movement in the forward and rearward directions in the front side outer shell 4.

A spacing 17 is formed in the inside of the rear side outer shell 5 and is open to the front face of the rear side outer shell 5. The spacing 17 is open also to the rear by way of a light passing hole 18a formed at a portion of a rear wall 18 of the rear side outer shell 5 a little lower than the center. The spacing 17 has a sectional shape of a slightly vertically elongated rectangular shape in a direction perpendicular to the optic axis X—X.

A motor accommodating chamber 19 is formed at a right upper portion of a rear end edge portion of the rear side outer shell 5, and the zooming motor 20 is securely accommodated in the motor accommodating chamber 19. A passing hole 19a is formed in a front wall of the motor accommodating chamber 19, and the output shaft 21 of the zooming motor 20 extends through the passing hole 19a.

The output shaft 21 of the zooming motor 20 has a sufficient length to extend to a front end of the front side outer shell 4, and a threaded groove is formed at a portion 21b (hereinafter referred to as "threaded shaft portion") except for a rear half portion 21a (hereinafter referred to as "sliding shaft portion") adjacent the zooming motor 20 and an opposite end portion 21c.

The output shaft 21 of the zooming motor 20 extends through the passing hole 19a of the motor accommodating chamber 19 and further through a support wall 23 which will be hereinafter described and through the inside of the radially projected rib 4a of the front side outer shell 4, and the end portion 21c thereof is supported on a front end wall of the radially projected rib 4a.

The threaded shaft portion 21a of the output shaft 21 extends over the substantially overall length in the radially projected rib 4a of the front side outer shell 4 while the sliding shaft portion 21a is positioned at a right upper portion in the rear side outer shell 5.

The guide shaft 22 is disposed at a left lower portion in the inside of the front side outer shell 4 and the rear side outer shell 5 such that it extends in the forward and rearward directions.

The support wall 23 is disposed in the rear side outer shell 5 such that it closes the front side of the rear side outer shell 5. A light passing hole 23a is formed at a portion of the support wall 23 a little lower than the center, and a tubular cylindrical lens tube 23b is formed integrally on and extends rearwardly from an inner circumferential edge of the light passing hole 23a of the support wall 23.

The lens 8 is disposed in the light passing hole 23a, and the lens 9 is disposed in the lens tube 23b.

A plurality of diaphragm blades 24 are disposed in front of the support wall 23 for opening or closing the light passing hole 23a of the support wall 23. The diaphragm blades 24 are driven by a motor not shown to perform such opening or closing motion to adjust the opening of the light passing hole 23a.

The master lens 10 is held in a light passing hole 25a formed at the center of a master lens holding member 25 having a ring-like profile. A mounting arm 26 is formed integrally at and extends radially outwardly from a right upper portion of the master lens holding member 25, and a cylindrical bearing portion 27 is formed integrally on and extends axially forwardly from the mounting arm 26. A pair of bearing metal members 28 are secured in a force-fitted condition at the opposite front and rear ends of an axial hole of the bearing portion 27.

A guide arm 29 is formed integrally at and extends radially outwardly from a left lower position of the master lens holding member 25 remote from the mounting arm 26, and a fork-shaped receiving portion 30 is formed at an end portion of the guide arm 29.

A coil bobbin 31 is mounted integrally on and extends forwardly from a portion of a front face of the master lens holding member 25 around the light passing hole 25a. The coil bobbin 31 has an intermediate portion thereof having a tubular profile and a pair of outwardly extending flanges formed at the opposite front and rear ends of the intermediate portion.

The bearing metal members 28 of the mounting arm 26 of the master lens holding member 25 are supported for sliding movement on the sliding shaft portion 21a of the output shaft 21 of the zooming motor 20 while the receiving portion 30 of the guide arm 29 of the master lens holding member 25 is supported for sliding movement on the guide shaft 22 thereby to allow the master lens holding member 25 to be moved in the forward or rearward direction in the rear side outer shell 5.

On the other hand, the nut 14 of the mounting arm 13 of the zooming lens holding member 12 is held in screwed engagement with the threaded shaft portion 21b of the output shaft 21 of the zooming motor 20 while the receiving portion 16 of the guide shaft 15 of the zooming lens holding member 12 is supported for sliding movement on the guide shaft 22 thereby to allow the zooming lens holding member 12 to be moved in the forward or rearward direction in the front side outer shell 4. Thus, when the zooming motor 20 rotates, the output shaft 21 is rotated and consequently the nut 15 is fed in the forward or rearward direction to move the zooming lens holding member 12 in the forward or rearward direction.

Referring now to FIGS. 1, 2, 5 and 6, an actuator 32 is provided for moving the master lens holding member 25 in the forward or rearward direction. The actuator 32 includes a yoke member 33 supported on the support wall 23, a magnet 34 supported on the yoke member 33, and an actuating coil 35 wound on the coil bobbin 31 of the master lens holding member 25.

The yoke member 33 is formed as a unitary member from a metal material having a high permeability and has an intermediate yoke portion 33a having a substantially ring-like profile, a cylindrical inner yoke portion 33b extending rearwardly from an inner circumferential edge of the intermediate yoke portion 33a, and an inner yoke portion 33c extending rearwardly from an outer circumferential edge of the intermediate yoke portion 33a in parallel to the inner yoke portion 33b. The inner yoke portion 33b of the yoke member 33 is secured in a force-fitted condition from rearwardly on the lens tube 23b of the support wall 23 while the intermediate yoke portion 33a is held in contact with and secured to a rear face of the support wall 23.

The magnet 34 has a cylindrical profile having a small length in an axial direction thereof and is magnetized such that it has the opposite polarities in a radial direction perpendicular to the direction of the axis. The magnet 34 is secured in an inwardly fitted condition to the outside yoke 33c.

The actuating coil 35 is wound on the coil bobbin 31 of the master lens holding member 25 and is positioned between the inside yoke portion 33b of the yoke member 33 and the magnet 34 with small gaps left from them.

Thus, the magnet 34 and the yoke member 33 form a closed magnetic path along which magnetic fluxes coming out from the magnet 34 pass, that is, a closed magnetic path along which such magnetic fluxes pass in a route of the magnet 34—outside yoke 33c—intermediate yoke portion 33a—inside yoke portion 33b—magnet 34, and the actuating coil 35 is positioned on such closed magnetic path.

Accordingly, when a driving electric current is supplied to the actuating coil 35, magnetic fluxes are generated from the actuating coil 35 in a direction corresponding to the driving electric current, and accordingly, the actuating coil 35 is urged in the forward or rearward direction. The master lens holding member 25 is moved by such urging force, thereby to move the master lens 10.

Figure 1:
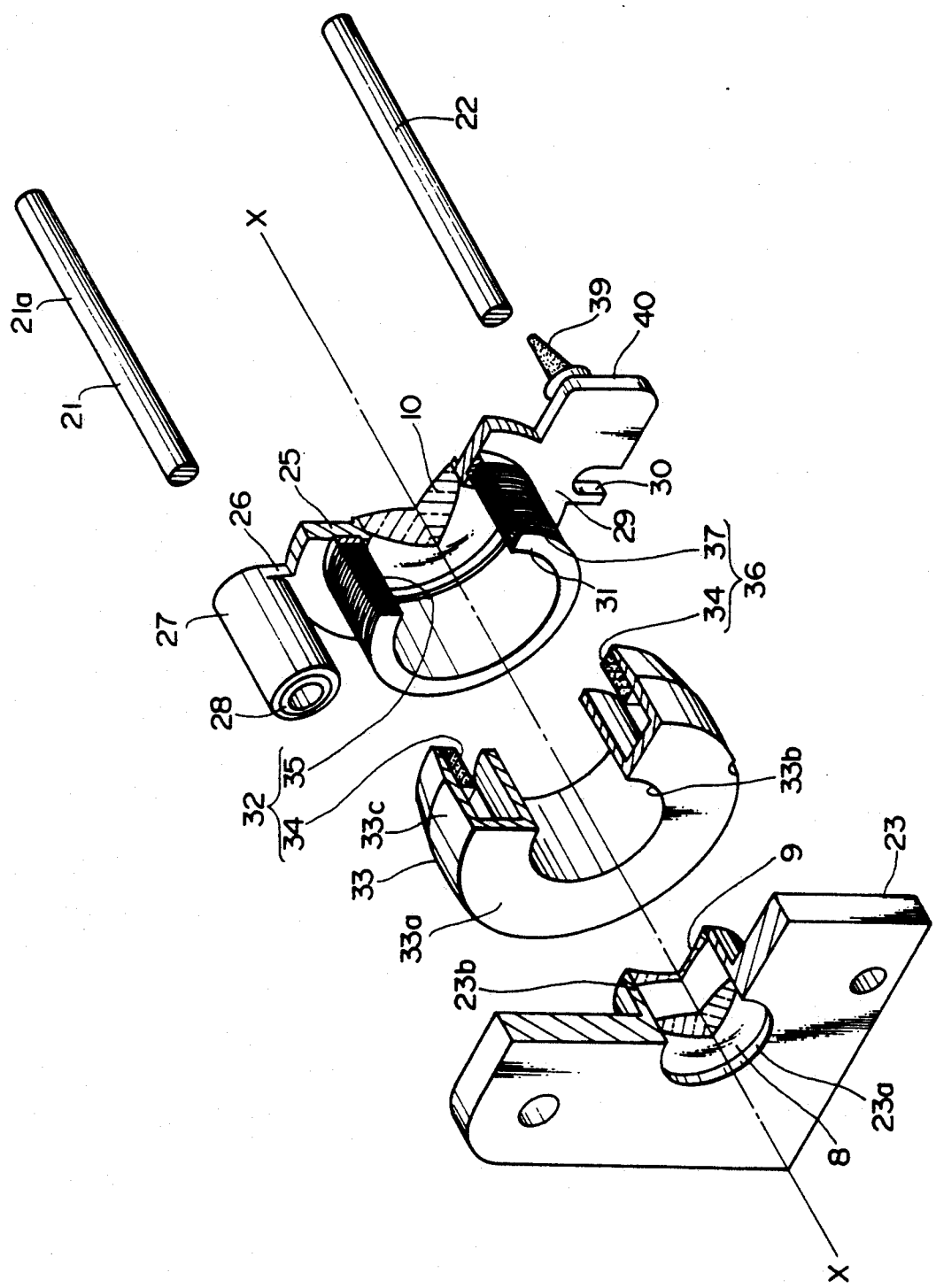
FIG. 1 is a front fragmentary perspective view, partly in section, of a lens barrel apparatus for a video camera showing a preferred embodiment of the present invention.
Figure 2:
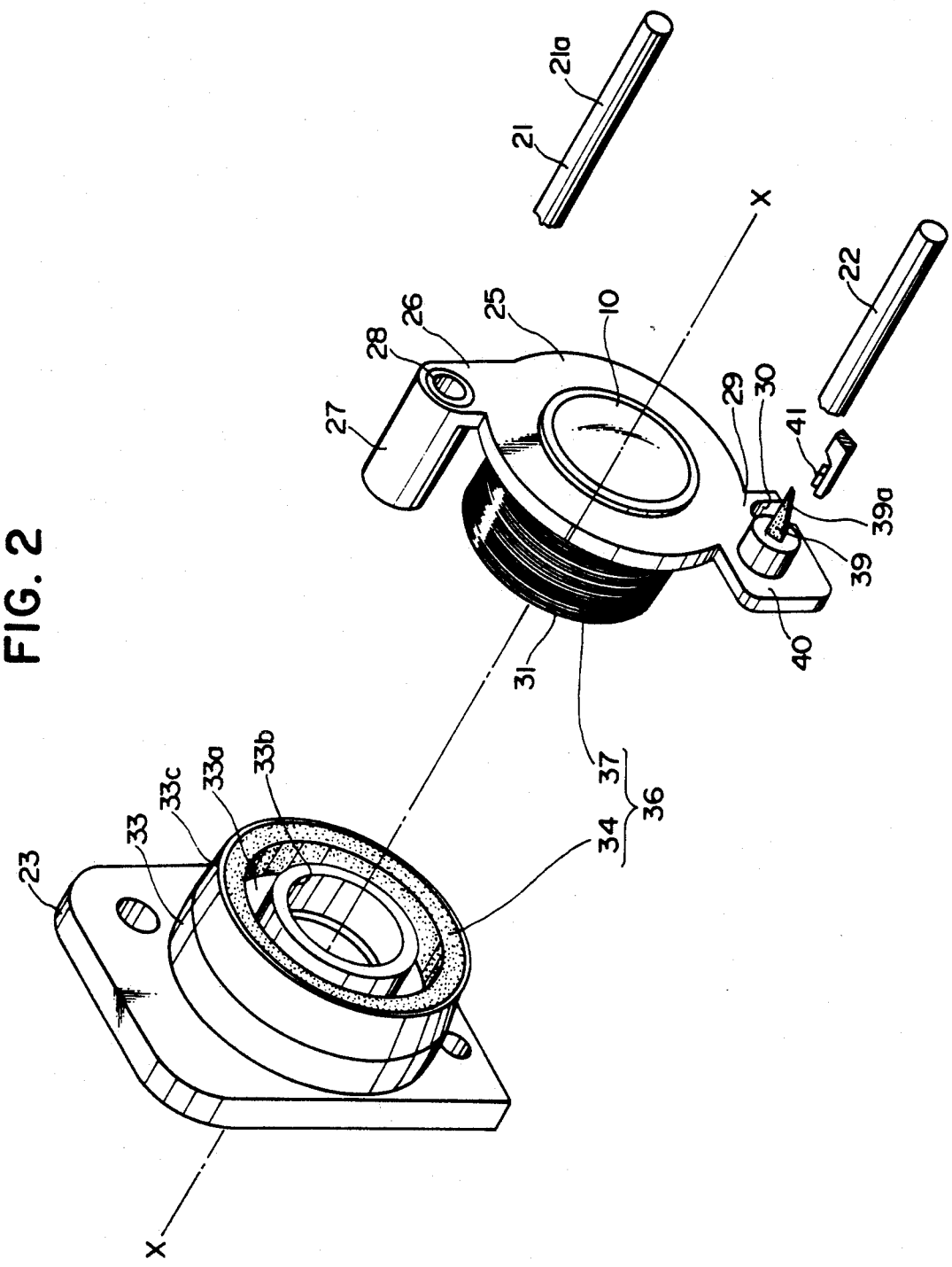
FIG. 2 is a rear fragmentary perspective view of several elements of the lens barrel apparatus of FIG. 1.

Referring now to FIGS. 1, 2 and 6, speed detecting means 36 is provided for detecting a speed of movement of the master lens holding member 25 in order to control such speed. The speed detecting means 36 is constituted from the magnet 34 provided on the support wall 23 and a detecting coil 37 wound on the coil bobbin 31 of the master lens holding member 25. In particular, the actuating coil 35 is wound on the coil bobbin 31 of the master lens holding member 25 as described above, and the detecting coil 37 is wound in an overlapping relationship on the actuating coil 35.

Thus, when the master lens holding member 25 moves, the detecting coil 37 is moved together therewith, and consequently, an electric current corresponding to a speed of such movement is induced in and flows through the detecting coil 37. Thus, a speed of movement of the master lens holding member 25 is detected by detecting a magnitude of such electric current.

It is to be noted that, when the master lens holding member 25 is moved so that the master lens 10 approaches its in-focus position, the speed of movement of the master lens holding member 25 is controlled so that it may be made low so that no hunting may take place upon focusing.

Position detecting means 38 is for detecting a position of the master lens holding member 25, or in other words, a position of the master lens 10. The position detecting means 38 includes an inclined magnet 39 mounted on the master lens holding member 25, and a Hall effect element 41 mounted on the rear wall 18 of the rear side outer shell 5. The inclined magnet 39 has a rectangular sectional shape in a direction perpendicular to a longitudinal direction thereof, and a front end portion thereof is supported in an embedded condition on a detecting member mounting portion 40 integrally formed on the left lower guide arm 29 provided on the master lens holding member 25. A front half portion 39a of a face of the inclined magnet 39 remote the optic axis X—X is inclined such that it approaches the optic axis X—X toward its front end as particularly seen in FIG. 6.

The Hall effect element 41 is of the linear type and is mounted in a mounting recess 18b formed at a left lower portion of the rear wall 18 of the rear side outer shell 5 such that it is opposed to the inclined face 39a of the inclined magnet 39. Accordingly, when the master lens holding member 25 is moved along the optic axis X—X, the distance between the inclined magnet 39 and the Hall effect element 41 is varied so that the density of those of magnetic fluxes coming out from the inclined magnet 39 which reach the Hall effect element 41 is varied. Thus, a voltage of a magnitude corresponding to the magnetic flux density then is outputted from the Hall effect element 41. A position of the master lens holding member 25 is thus detected by detecting such voltage.

The position detecting means may be replaced by a potentiometer.

It is to be noted that, while the detecting coil 37 in the embodiment described above is of the type wherein it is wound in an overlapping relationship on the actuating coil 35 wound on the coil bobbin 31, alternatively the actuating coil 35 may be wound in an overlapping relationship on the detecting coil 37 wound on the coil bobbin 31. Further, while the actuating coil 35 and the detecting coil 37 are mounted on a movable side member (master lens holding member 25) while the magnet 34 is mounted on a fixed side member (support wall 23), alternatively the actuating coil 35 and the detecting coil 37 may be mounted on a fixed side member while the magnet 34 is mounted on a movable side member. In the latter case, since the coils 35 and 37 are wound on the fixed side member, wiring to the coil is facilitated.

Further, while the present invention is applied to a lens barrel apparatus for a video camera in the embodiment described above, the application of the present invention is not limited only to such arrangement, and the present invention can be applied widely as a lens barrel apparatus for a common camera such as, for example, a lens barrel apparatus for a still camera.

Having now fully described the invention, it will be apparent to one of ordinary skill in the art that many changes and modifications can be made thereto without departing from the spirit and scope of the invention as set forth herein.

What is claimed is:

1. A lens barrel apparatus for automatic focusing, comprising:
    an outer shell;
    a lens holding member holding a focusing lens thereon mounted in said outer shell for movement in a direction of an optic axis of said focusing lens;
    an actuator including an actuating coil wound to a cylindrical bobbin of said lens holding member and a cylindrical magnet secured to a ring shaped yoke, and said actuating coil and cylindrical magnet arranged in coaxial relationship with the optic axis of said focusing lens; and
    a detecting coil wound on said cylindrical coil bobbin overlapping with said actuating coil for detecting a velocity of movement of said focusing lens.

2. A lens barrel apparatus for automatic focusing according to claim 1, wherein said lens holding member includes a lens thereon, a coil bobbin portion serving as said coil bobbin, and lens position detecting means for detecting a position of said focusing lens in the direction of the optic axis.

* * * * *